Figure 4:
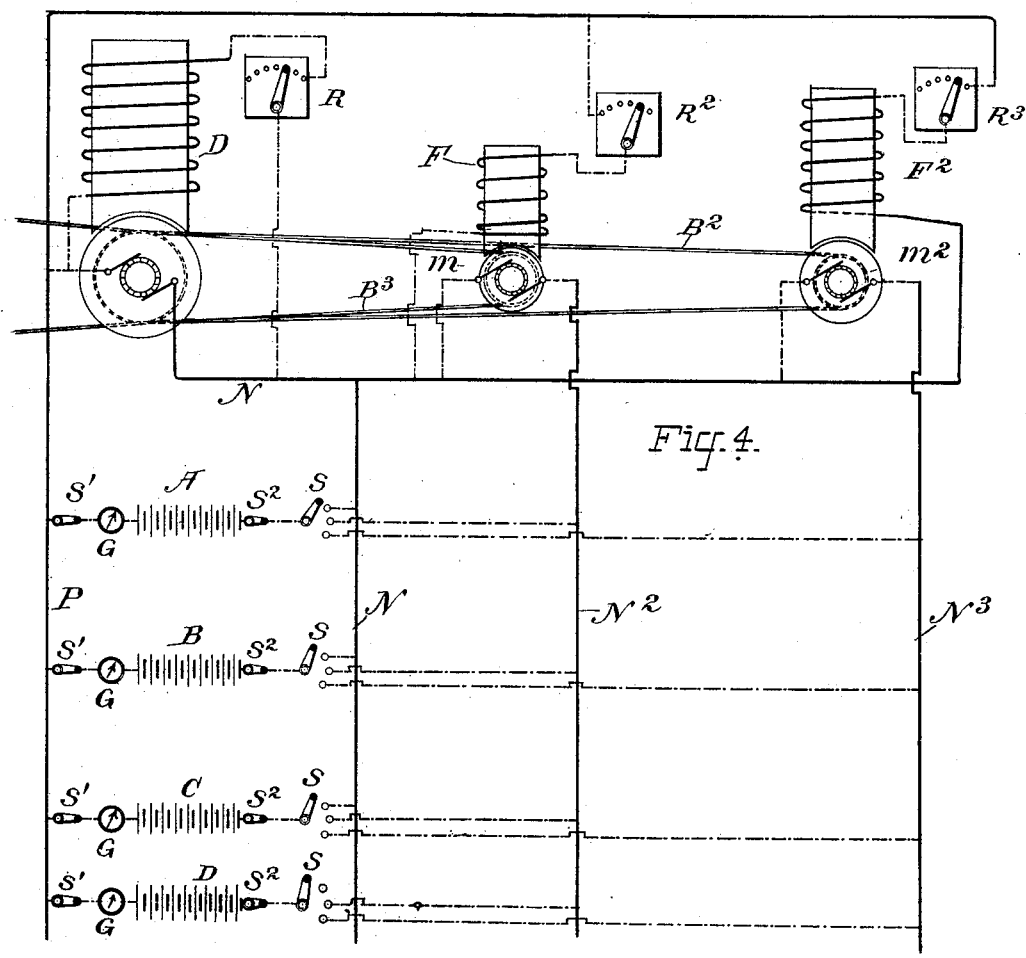

No. 614,228. Patented Nov. 15, 1898.
C. O. MAILLOUX.
METHOD OF CHARGING SECONDARY BATTERIES.
(Application filed Apr. 24, 1891.)
(No Model.) 5 Sheets—Sheet 1.
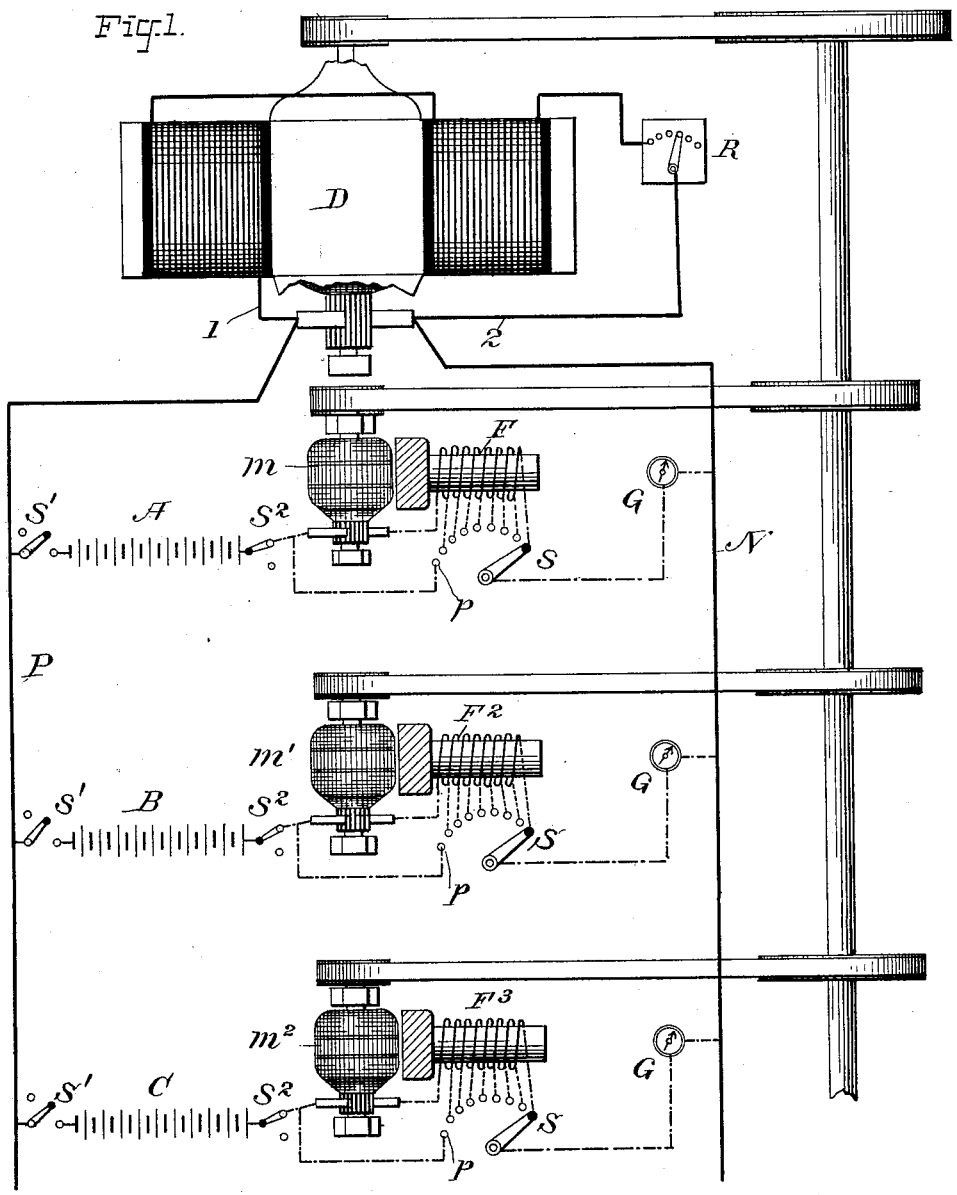

No. 614,228. Patented Nov. 15, 1898.
C. O. MAILLOUX.
METHOD OF CHARGING SECONDARY BATTERIES.
(Application filed Apr. 24, 1891.)
(No Model.) 5 Sheets—Sheet 2.
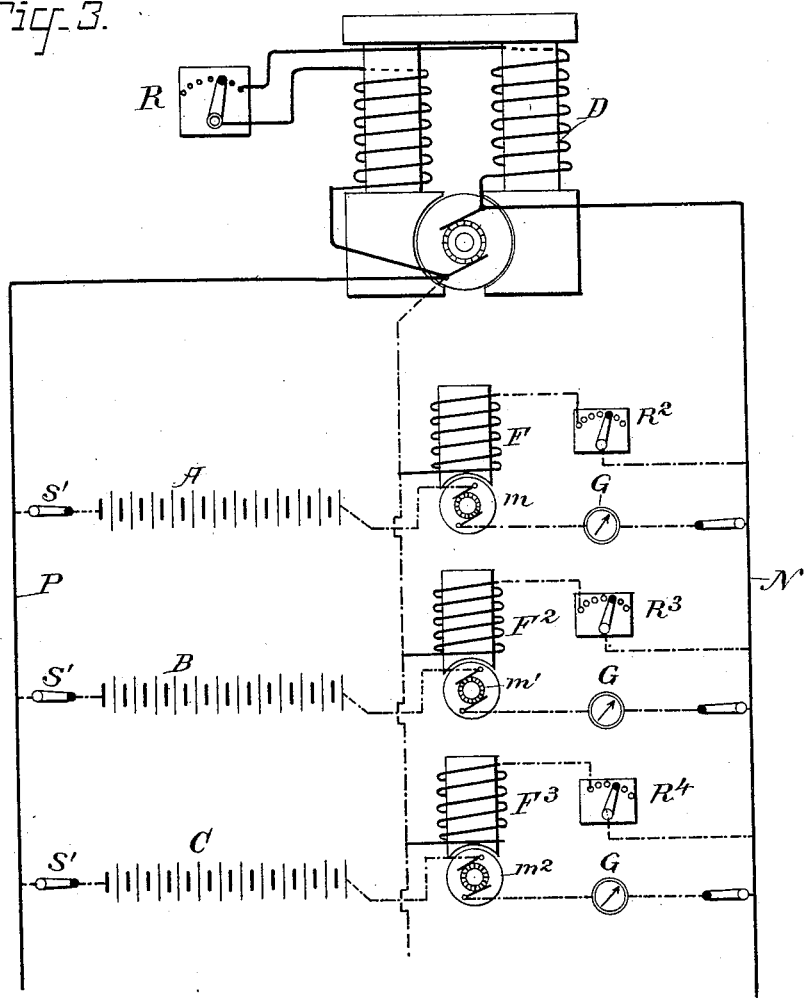
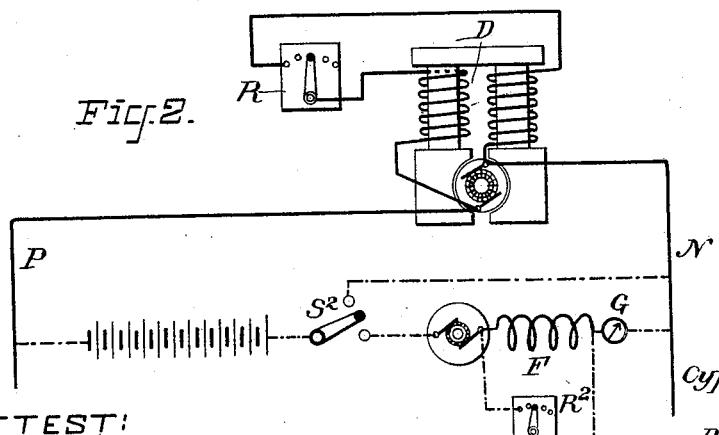
INVENTOR:
Cyprien O. Mailloux
By H. C. Townsend
Attorney
ATTEST:
J. A. Hurdle
T. F. Courey No. 614,228. Patented Nov. 15, 1898.
C. O. MAILLOUX.
METHOD OF CHARGING SECONDARY BATTERIES.
(Application filed Apr. 24, 1891.)
(No Model.) 5 Sheets—Sheet 3.

ATTEST:
INVENTOR:
Cyprien O. Mailloux
By H. L. Townsend
Attorney

No. 614,228.  Patented Nov. 15, 1898.
C. O. MAILLOUX.
METHOD OF CHARGING SECONDARY BATTERIES.
(Application filed Apr. 24, 1891.)

(No Model.)  5 Sheets—Sheet 4.

ATTEST:

INVENTOR:
Cyprien O. Mailloux
By H. C. Townsend
Attorney

No. 614,228. Patented Nov. 15, 1898.
C. O. MAILLOUX.
METHOD OF CHARGING SECONDARY BATTERIES.
(Application filed Apr. 24, 1891.)

(No Model.) 5 Sheets—Sheet 5.

ATTEST:

INVENTOR:
Cyprien O. Mailloux

By H. C. Townsend
Attorney

UNITED STATES PATENT OFFICE.

CYPRIEN O. MAILLOUX, OF NEW YORK, N. Y.

METHOD OF CHARGING SECONDARY BATTERIES.

SPECIFICATION forming part of Letters Patent No. 614,228, dated November 15, 1898.

Application filed April 24, 1891. Serial No. 390,275. (No model.)

*To all whom it may concern:*

Be it known that I, CYPRIEN O. MAILLOUX, a citizen of the United States, and a resident of New York, in the county of New York and State of New York, have invented a certain new and useful Method of Charging Secondary Batteries, of which the following is a specification.

My invention relates to methods of and apparatus for charging secondary or storage batteries employed for electric-railway traction or other industrial uses.

The invention relates more particularly to the regulation or control of the charging-current, and is especially useful in those cases where the charging has to be done on a large scale and a large number of batteries of the same or a different number of cells require to be charged at or about the same time.

The principal object of my invention is to provide means whereby the charging-current sent into the various groups or series of cells in process of charging may be regulated or controlled in a reliable manner with certainty and precision and without loss of efficiency.

In the operation of charging storage batteries it is desirable to make some provision for controlling or adjusting the charging-current either to accommodate it to batteries having a different number of cells in series or for the purpose of maintaining a flow of charging current at a practically constant amount during the whole or a part of the charging period as the counter electromotive force of the battery rises or to adjust or vary the charging-current at different stages of the operation—as, for instance, to permit the battery to begin charging at a rapid rate and to gradually diminish the rate as the charging is approaching completion.

For the purpose of obtaining the control necessary to various stages of the charging operation or to varying numbers of cells in series it has been the practice heretofore to provide a dead-wire resistance consisting of a conductor opposing a resistance to the flow of the current because of its low conductivity, such resistance being put into the circuit with the battery and charging source and adjusted to the particular size of battery or to the particular state of the charging operation and counter electromotive force of the battery, as desired. In the ordinary way of charging batteries the procedure would be to put in a large amount of this resistance at the beginning of the charging operation, when the counter electromotive force of the battery is low, and then to cut out the resistance as the charging progresses and the counter electromotive force of the battery rises, so that the charging-current may be kept up to the proper strength required for the operation of charging either at a constant rate or at a gradually-diminishing rate. It will be obvious that with such a device a great deal of the energy is wasted at the beginning of the operation, since the potential of the charging source when several batteries are being charged in multiple must be adjusted to the maximum counter electromotive force of the battery existing therein toward the close of the charging operation, and at the beginning of the operation the surplus energy of the charging source must be taken up in the resistance. On account of this constant waste of energy caused by the heating effect of the current passing through, their cumbersomeness, and the complications of circuits and construction required, these resistances are very objectionable.

The object of my invention is to obviate the necessity of using such resistances and to provide a much simpler and more perfect means for effecting the current regulation or control.

My invention consists, essentially, in regulating or controlling the charging-current by supplementing either or both the direct and counter electromotive forces acting and reacting upon the circuit of the battery to be charged. In other words, I provide for a variable supplementing either of the direct electromotive force of the charging-current which operates in opposition to the counter electromotive force of the battery in charging or I provide an electromotive force which supplements that of the battery to be charged, said supplementing action being varied or adjusted according to the state of charge and the rise of counter electromotive force of the battery or to the particular number of cells in series in the battery to be charged and the consequent electromotive force thereof. Such supplemental or auxiliary electromotive force is preferably that of the armature of a dynamo or motor and may be applied as an electromotive force acting on the circuit of the charging dynamo and battery to be charged in such way as to assist the charging electromotive force or the counter electromotive force of the battery, or both, and it may be graduated to the various states of charge of the battery either by varying the electromotive-force capacity of a single armature or by using several armatures of different adjusted electromotive-force capacities and placing them in circuit in turn. As will be obvious, the changes of supplemental electromotive force may be produced in either way with substantially the same effect. Such electromotive force may be changed at the same rate with the change in the counter electromotive force of the battery in charging or may be made to take place at a different rate, the effect being either to cause the charging-current to flow in constant amount through the whole operation or to gradually increase or to gradually diminish toward the close of the operation, as may be desired.

By my invention the graduated supplemental electromotive force may be one which assists the main charging dynamo or source, so that the potential of the latter need be only that suitable to the beginning of the charging operation, whereas in the old methods of charging its potential had to be greater or that required for the end of charge, and a part of the energy was necessarily wasted at the beginning.

The armature used as the source of the supplementing electromotive force may obviously act when its magnetic field is suitably excited as a generator whose electromotive force will supplement that of the charging source or main, or when made to operate as a motor-armature it may act to supplement the counter electromotive force of the battery in process of charging. Its variation of effect in accordance with the progress of the charge may be produced by changing its magnetic field in any way or by any other desired means. If the armature is so related by the polarity of its magnetic field as to operate as a generator, the initial potential difference of the source of supply may be, if desired, and is preferably, taken somewhat lower than what is adequate to force current through the battery in opposition to the counter electromotive force and resistance in the said battery. This initial electromotive force is then raised or supplemented by the action of the auxiliary armature included in the circuit until the sum of the two electromotive forces—initial and supplemental—becomes sufficient to send the desired current through the respective branch of circuit in opposition to the counter electromotive force and resistance encountered therein. It is well known that as the operation of charging secondary batteries proceeds their electromotive force rises, so that they oppose to the initial electromotive force of the source of supply a constantly-increasing power. If it is desired to maintain the charging-current constant, it can be done simply by increasing the action of the armature as a generator to the proper extent. In fact, by either changing the speed or strength of magnetic field of the supplemental generator the charging-current can be governed and controlled with certainty and independently of any changes in the initial or the counter electromotive forces involved. This change of the speed or magnetic-field strength may be effected in various ways, as will be shown further. By simply reversing the polarity of its magnetic field the supplemental armature becomes related differently to the initial and counter electromotive forces involved. Its action will now supplement the counter electromotive force of the battery instead of the initial electromotive force of the source of supply. In this case the initial electromotive force is preferably made as high as or higher than the highest value that will be required to force a current through the groups of cells when the said cells have reached the phase of highest counter electromotive force, such as toward the end of the charging process. The electrical energy expended in this motor and giving it rotation and capacity to do mechanical work is abstracted from the branch circuit in which the armature is connected and causes a counter electromotive force in said branch in the same direction as the counter electromotive force of the cells being charged. Hence by raising the counter electromotive force of the motor the effect is the same as raising the counter electromotive force of the battery itself— namely, the available electromotive force (which is the difference between the initial and counter electromotive forces) is reduced, and consequently the charging-current is also reduced.

At the beginning of the charge, when the cells oppose the least counter electromotive force, the counter electromotive force of the motor would be allowed to go higher. As the charging proceeds and the counter electromotive force of the cells rises the counter electromotive force of the motor would be diminished. Thus it will be seen that by regulating the electromotive force of the supplemental armature—such as by changing its speed, the strength of its magnetic field, or the position of the brushes, or in any other way well known in the art—the charging-current can be controlled or changed to any desired extent. The regulation can be controlled so as to maintain the charging-current constant, if desired, or it may be increased or diminished at any desired rate. Thus, for instance, the electromotive force of the armature might be decreased with the increase of counter electromotive force of the battery, but at a less rate, so that the difference of potential available for charging and the resultant current diminish slightly toward the close of the operation. Conversely, the rate of charging toward the end might be increased by decreasing the electromotive force of the motor at a relatively-greater rate.

The energy expended in the motor is not totally wasted, as in the case of a dead resistance, heretofore used instead, but is available for use by being reconverted into mechanical energy and can be utilized in various ways, the only losses being those incident to conversion.

Having set forth the general principles of my invention, I will now proceed to describe it more in detail and with reference to the accompanying drawings, which form part of this specification.

Figure 5:
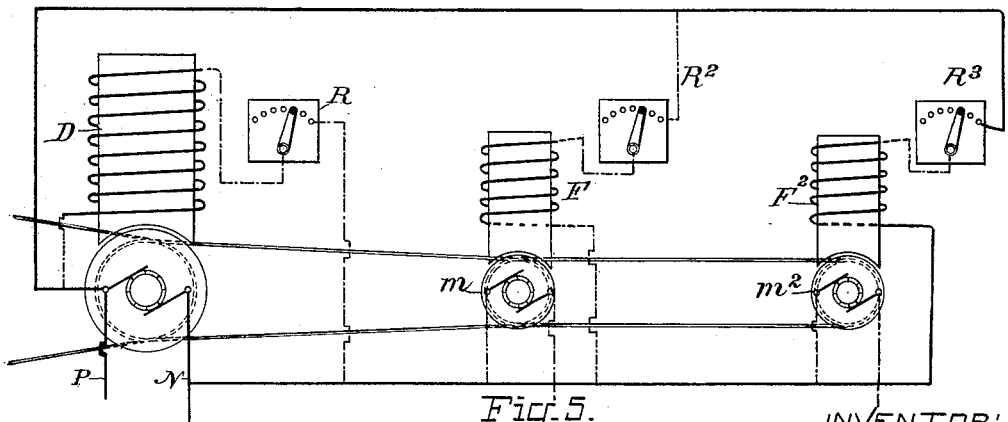
Figure 6:
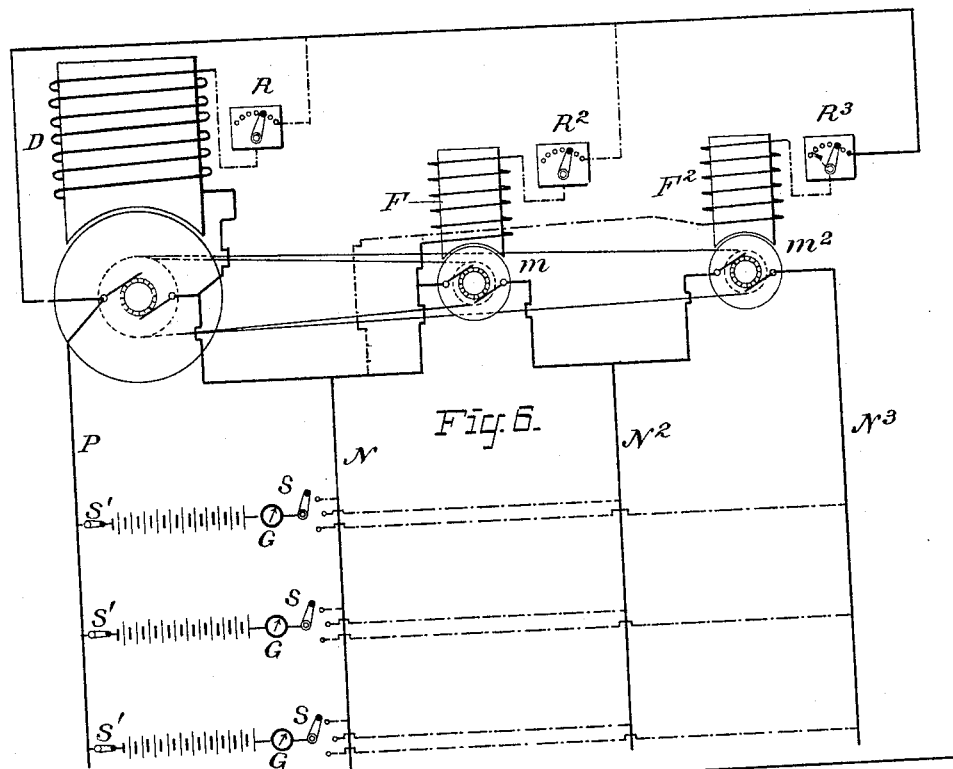
Figure 7:
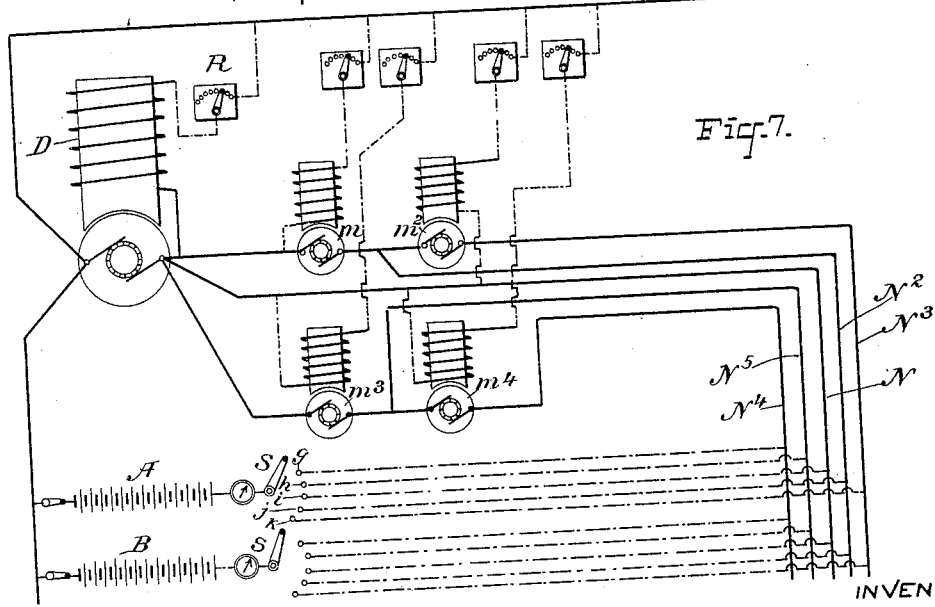
Figure 8:
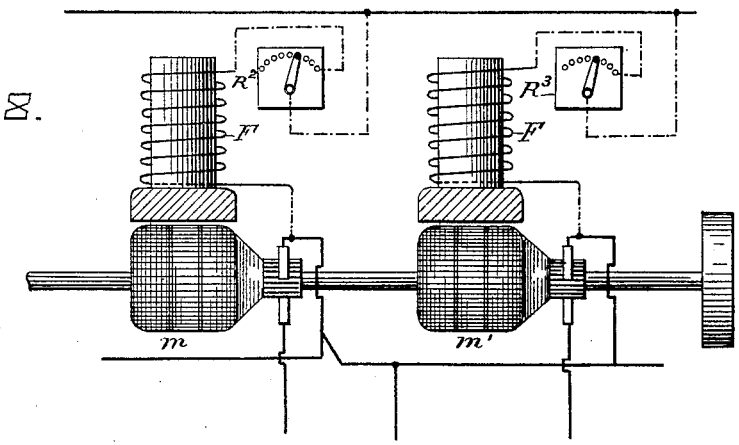
Figure 9:

In the accompanying drawings, Figure 1 is a diagram of apparatus embodying my invention. Fig. 2 illustrates simply a modification in the manner of controlling the electromotive force of the armature which assists the charging or the counter electromotive force. Fig. 3 illustrates a modification in the connection of the field-magnets for the supplementary armatures. Fig. 4 is a diagram illustrating a modification in the connection of the various machines to one another and to the charging circuits and switches. Fig. 5 illustrates a modification in the manner of mechanically connecting the machines. Figs. 6 and 7 are diagrams illustrative of other modifications of my invention. Fig. 8 illustrates merely a modification in the manner of driving the armatures of the various machines from the same power. Fig. 9 is a detail view of the invention.

These diagrams are merely symbolical of the devices and appliances employed, the devices and appliances used being all well known and understood in the art.

Referring to Fig. 1, the charging-dynamo D is connected by wires leading from its terminals 1 2 to the leads P P N N. This dynamo is preferably of the shunt-wound description and provided with a shunt-rheostat R, by means of which the electromotive force generated may be controlled and regulated. Several such dynamos may of course be connected to the same charging-circuit P P N N, just as is done in feeding a given set of mains from a central station comprising several dynamos.

A B C represent three several batteries or groups of batteries to be charged from the mains or leads P N, and $S'$ $S^2$ suitable connecting devices—such, for instance, as electric switches—for placing them in connection with the mains in the ordinary or any suitable manner.

G G G are suitable current-measuring devices.

In the several connections leading from the mains to the batteries are placed the armatures of small electrodynamic machines, preferably series wound. F $F^2$ $F^3$ are the field-magnet coils, and $m$ $m'$ $m^2$ the armatures, of said machines. As already stated, the field and armature of each machine may be so related that the armature shall be capable of working as a generator or as a motor and to supplement by its electromotive force the charging electromotive force or the counter electromotive force of the battery.

To conveniently vary its electromotive force, a switch S may be provided to change the number of coils in action in the sectional field-magnet coil of the machine, as indicated. Each switch S may, if desired, have a contact-point $p$, by which charging-current may be fed direct to the battery without passing through the armature.

If the machine be converted into a generator, then mechanical motive power is provided for rotating the armature. In this case the potential difference between the leads P and N is purposely made somewhat lower than enough to force current through the batteries. If preferred, it may be made just sufficient to force the proper charging-current through the cells when they are beginning to be charged, at which time their counter electromotive force is usually considerably lower. In such case the switch S is turned to connect at $p$ and cut out the supplemental machine. After the operation of charging has proceeded for a time, the length of which depends upon the conditions of the case, the charging-current, as will be shown at G, will become reduced in consequence of the rise in the counter electromotive force of the battery. The switch S is then turned to the right a sufficient number of steps, allowing the armature-current to pass through armature $m$ and a certain number of turns of the field-coil F. The magnetic field of the supplemental machine now becomes partially excited and the rotation of the armature $m$ produces an electromotive force which assists that of the dynamo D and raises it to a definite extent so far as the particular series of cells in circuit with such supplemental machine is concerned. The farther to the right the switch S is moved the stronger the magnetic field is made and the more the electromotive force of the main source D is strengthened. After the charging has gone on for a certain further length of time and the charging-current becomes considerably reduced by the increased counter electromotive force of the battery the assisting electromotive force of the machine may be again increased by moving the switch-arm S. These adjustments may be made any desired number of times during the charging operation.

In some of the modified combinations of apparatus hereinafter described the arrangement is made such that four several adjustments may be obtained.

The power required to cause the rotation of the armature $m$ will vary in direct proportion with the electrical energy introduced into the branch of circuit including said armature $m$. Thus if the electromotive force added by the small machine $m$ to the electromotive force of the main source is ten (10) volts and if the charging-current is twenty (20) amperes the small machine will supply two hundred (200) watts to the circuit and absorb from the prime mover a corresponding amount of energy, besides the energy lost in conversion.

It will be understood that instead of three batteries or groups of batteries any desired number can be connected to the mains P N. It will also be seen that since each branch can be regulated individually and independently of the rest it is possible to charge batteries having an unequal number of elements connected in series from the same source D.

As shown in Fig. 2, instead of varying the number of turns of field-coils F in circuit by cutting them in or out of circuit, as in Fig. 1, a shunting resistance $R^2$ may be used, which is connected to the terminals of the field-coil F. By varying the amount of resistance in the shunt branch or by-path a greater or smaller amount of current is diverted from the field-coil F, and thus the field magnetism produced by a given volume of current may be readily controlled.

In Fig. 3 I show a further modification in which a shunt-wound instead of a series-wound machine is used in each branch circuit. The field-coils F $F^2$ $F^3$ are here shown as connected to the main N and a main in multiple with main P, leading from the dynamo D. The arrangement is virtually the same as that of a separately-excited machine, which could evidently be substituted also. The rheostats $R^2$ $R^3$ $R^4$ included in each shunt-circuit serve, as will be readily understood, to vary the exciting-current passing through the field-coils F $F^2$ $F^3$.

I have thus far described the small supplemental machine as so related to the charging-current that it operates as a dynamo-electric machine or generator. I will now describe the action of the same apparatus when related so as to operate as an electrodynamic machine or motor.

The organization of devices and the connections remain exactly the same as before; but the electromotive force of the main source of current D must be relatively higher instead of being lower than what is necessary to force the current through the groups of secondary cells. In this case the current sent into each branch causes the armature of the supplemental machine to turn as a motor.

The electromotive force of the small machine may be regulated exactly as before; but this electromotive force is now in the contrary direction and opposes instead of assisting the electromotive force of the charging-current supplied from dynamo D, thus practically assisting the counter electromotive force of the battery being charged, and thereby practically reducing the potential difference available at the terminals of the series of cells to be charged. The greater the electromotive force of the supplemental machine the lower will be the charging-current. Therefore by regulating the electromotive force of said machine the charging-current may be controlled and regulated in amount.

By running a motor in the battery-circuit by means of the charging-current, as here illustrated, so as to allow its counter electromotive force to assist that of the battery, and by giving it a constant load, as by a friction-brake, the charging-current or rate of charging will be automatically maintained at a practically constant point without adjusting the field or shifting the brushes of the motor.

It is well known that if a current traverses a motor-armature the turning effect of the armature in motion is independent of the speed, provided the strength of the field is kept constant. Inversely, if the static movement tending to resist the motion of the armature is maintained constant the current will thereby automatically be kept constant, whatever means we may employ to vary it. Hence when the motor is in circuit with the battery, as shown, the increase of counter electromotive force of the battery as it acquires charge and which would tend to cut down the current is compensated for by the action of the motor, whose speed will correspondingly vary and lessen until its counter electromotive force decreases in amount enough to permit the same constant-current flow to be maintained through it and the battery. It is seen, therefore, that so long as the magnetic field of the small machine remains constant the current rate will be automatically maintained constant. If now the magnetic field be increased in any manner, as by turning the switch, the same turning effort, as experiment proves, will now require a smaller current through the armature. The speed of the motor will instantly increase until the counter electromotive force is sufficient to choke the current down to this reduced amount, and this current rate will be maintained constant as before. This action may be utilized in each of the several stages of the charging. Thus, for instance, the field may be adjusted to permit the current required for the initial stage of charging to flow through the armature, and while any given adjustment of field is maintained the battery will go on charging by a definite current or at a fixed rate, which is automatically maintained by the action of the motor without any adjustment thereof. After the charging has been allowed to progress at such rate for the desired time the field may be adjusted to a greater strength, thus lessening the current which may flow, and the battery may be allowed to charge at such definite constant lower rate for the desired time, and so on to the final stage of charging.

The constant load of the motor may be maintained by a Prony friction-brake—such, for instance, as shown in Fig. 9—or the friction of the armature-shaft in its bearings might even be utilized for the purpose. The adjustment of the current to different stages of the operation or to batteries of different resistance might be accomplished by other means—as, for instance, by varying the mechanical loading of the motor through the adjustment of the brakes, also by shifting its brushes, or otherwise. This method of automatically preserving a constant rate of charge of the battery I do not herein specifically claim, as it forms the subject of another application for patent filed by me April 24, 1891, Serial No. 390,278, Patent No. 567,545, dated January 26, 1892.

The product of the counter electromotive force produced by the small machine into the current passing through the armature represents in watts the energy abstracted from the branch circuit and made available for conversion into mechanical energy of motion. Hence, if the motor is belted or geared to the main dynamo D or the prime mover supplying the power thereto the mechanical energy resulting from the conversion will reduce by an amount equal to said energy the power required to drive the main dynamo. This action I propose to fully utilize in practice and in a systematic manner in the ways hereinafter described.

Fig. 4 shows a modification in which the same supplementary machine is made to serve for several batteries or groups of batteries. The supplemental machines revolve in magnetic fields independently excited by current from the main dynamo, exactly as shown in Fig. 3, or from any other source. In this case the supplemental machines or generators of electromotive force, counter or assisting, should normally have different capacities or be adjusted to have different effects upon the circuits. Such difference of effect might be obtained by operating one as a generator and another as a motor. They are placed in branches from the main or lead N, such branches $N^2 N^3$ constituting auxiliary or supplemental leads. Assuming that they are generators of electromotive force assisting the main charging source and $m^2$ is the greater, there will be available a certain potential difference due to the power of the main machine between P and N and a still greater difference between P and $N^2$. The switches S are each provided with contacts connected severally to the leads N $N^2$ $N^3$, so that the batteries A, B, C, or D, connected at one terminal to the main P, may by means of the switch S be connected at its other terminal either to N or to $N^2$ or to $N^3$. It is obvious that the system might be extended to include a third supplemental generator and a third supplemental branch, such third generator being, however, of a greater capacity than $m^2$, so as to give a greater range of potentials or a larger number of variations of potential available in the charging of the batteries. It will be understood that the main machine is preferably wound or provided with appliances to permit a definite potential difference to be maintained at its terminal or upon the leads P N. When a switch S is placed on the contact connected to N, the cells or groups of cells governed by said switch will receive the full potential difference between P N, or that due to the main charging-dynamo. When the switch is connected to $N^2$, the potential difference is that resulting from the combined effects of the main charging-dynamo and the supplemental generator $m$. This combined effect is the sum of the two electromotive forces of D and $m$, respectively, when $m$ acts as a generator, while it is equal to their difference when the armature $m$ acts as a motor. In the same way when the switch rests upon contact connected to $N^3$ the resulting electromotive force is either the sum of or difference between the electromotive forces of D and $m^2$. The machines whose armatures are $m$ and $m^2$ are shown belted by belt $B^2$ $B^3$ to the dynamo D or its prime mover. Any power consumed by said machines is therefore derived from the same source, and any power developed is returned to the same source that drives dynamo D. Part of the machines can be worked as generators and the rest as motors, or they may be all worked as generators or all as motors.

As an illustration of the practical working, I will assume that the batteries A B C, &c., each consists of one hundred cells of the Planté type, requiring a potential difference of 2.1 volts per cell at the beginning and 2.35 at the end of charge to maintain the proper charging-current. The potential difference employed must therefore vary between 2.10 and 2.35 at the terminals of each group. If both $m$ and $m^2$ were to be assumed to act as generators, the electromotive force of the dynamo D would be made about two hundred and ten volts, that of $m$ would be adjusted at about fifteen volts, and that of $m^2$ at about twenty-five bolts. The cells would begin to charge with the potential from the dynamo D alone. After a time the switch would be turned so as to include the potential of machine $m$, making (two hundred and ten plus fifteen) two hundred and twenty-five volts. When the current has again fallen to a low value in consequence of the rise in the counter electromotive force of the cells, the switch is moved so as to bring the group under the combined potentials of D and $m^2$, giving (two hundred and ten plus twenty-five) two hundred and thirty-five volts. Assuming now that the machines $m$ $m^2$ act as motors, the dynamo D would in this case be adjusted to give two hundred and thirty-five volts. At the beginning of the charge the battery would be connected through the machine $m^2$, giving a resultant potential of (two hundred and thirty-five minus twenty-five) two hundred and ten volts. After a time the battery would be transferred to $m$, giving a voltage of (two hundred and thirty-five minus fifteen) two hundred and twenty, and, lastly, the charging would be finished at the full potential (two hundred and thirty-five) of the dynamo D. Assuming now that one machine $m$ operates as a motor (fifteen volts) and the other $m^2$ as generator, (ten volts,) the potential of dynamo D would be adjusted at two hundred and twenty-five. The charging would begin with the motor $m$ included in circuit, the available potential being the difference, (two hundred and twenty-five minus fifteen,) two hundred and ten volts. After a time the battery would be connected to the dynamo D alone, and, lastly, the charging would be finished with the combined potentials of D and $m^2$, (two hundred and twenty-five plus ten,) two hundred and thirty-five volts. The latter plan is that which I prefer to follow in practice.

Fig. 5 shows a modification which I usually adopt with this plan. Instead of belting the machines $m$ $m^2$ individually to the dynamo or the prime mover, I belt only one of them and then belt the two machines to each other. In practice I sometimes combine the two supplemental machines into one by mounting them upon the same shaft, as indicated in Fig. 8. The advantage of thus combining the generator and the motor armatures is that the power required to be taken from or returned to the prime mover is much less than by the other ways, being equal to the difference between the amounts of energy in action at each machine. In actual practical working when a large number of batteries are at different phases of charge the adjustments may be made such that practically very little power is transferred to or from the prime mover, the amounts absorbed and returned being nearly balanced, so as to nearly offset each other.

Fig. 6 shows another modification which possesses some advantages. The connections are the same as in Fig. 4, with the exception of the armatures $m$ $m^2$, which are connected in series with each other and with the armature of dynamo D, instead of in parallel. Sub mains or leads extend from intermediate portions of the series of machines and from the end of the series, as indicated at $N^2$ $N^3$, and the switches S are provided with contacts connecting the said sub mains or leads. When the switch is on the contact connecting directly with N, the dynamo D is alone in action. When it makes contact with the next point leading to $N^2$, the main charging-machine and the supplemental armature $m$ are combined in series, while when it connects with the terminal contact leading to $N^3$ the main charging-machine has its electromotive force combined with that of both $m$ and $m^2$.

Fig. 7 illustrates the manner in which connections may be made when the arrangement illustrated in Fig. 6 is employed, using two or more supplemental machines as motors and two or more as dynamo-electric generators. The dynamo-electric generators are indicated at $m$ $m^2$ and the motors $m^3$ $m^4$. The two machines $m$ $m^2$, whose electromotive force, either singly or together, can be added to that of the main charging machine or source, are connected, the same as in Fig. 6, to the contacts of the switches, and the machines $m^3$ $m^4$, whose electromotive force, either singly or together, opposes that of the main charging-dynamo and assists that of the battery, have similar connections to additional switch-contacts.

It will be obvious that in the case of the machine arranged in series, as in Figs. 6 and 7, the supplemental machines may have the same electromotive-force capacity. The arrangement shown in Fig. 7 may be used as follows: By moving the switch S to make contact with switch-stud $g$ the particular battery controlled by said switch will receive the combined action of the main dynamo and the two motors $m^3$ $m^4$, as will be seen by following the connections, the available potential being that of the main charging-dynamo less the combined counter electromotive force of the two armatures $m^3$ $m^4$. By moving the switch to $h$ the motor $m^4$ is cut out. At $i$ the batteries receive the action of the dynamo D alone. At $j$ the dynamo is supplemented by the machine $m$, whose electromotive force assists that of D. At $k$ it is supplemented by both $m$ and $m^2$. The small machines are preferably connected together and to the prime mover, as before, so that energy may be transferred to or from said prime mover as the conditions of operation require. It will be clearly understood by reference to the drawings that any number of groups may be connected simultaneously to these charging-mains. It is only necessary that the armatures $m$ $m^2$ $m^3$, &c., shall have sufficient current-carrying capacity to carry the current passing through them without undue heating or undue drop of potential. Each battery or group of batteries A B, &c., as will readily be seen, can be successively connected to the potentials that are appropriate for its rate or its phase of charge without interfering in the least with the other groups of cells. Moreover, the present arrangement renders it possible to charge batteries having different numbers of cells in series and consequent different electromotive force.

What I claim as my invention is—

1. The method of charging secondary batteries which consists in producing progressive changes of supplemental electromotive force acting with an electromotive force in the circuit of said battery, as described, and in accordance with and progressively graduated to the progress of the charge and increases of counter electromotive force in said battery, as and for the purpose set forth.

2. The method of charging secondary batteries which consists in producing progressive changes of supplemental armature electromotive force acting with an electromotive force in the circuit of said battery, as described, and in accordance with and progressively graduated to the progress of the charge and increases of counter electromotive force in said battery, as and for the purpose set forth.

Signed at New York, in the county of New York and State of New York, this 22d day of April, A. D. 1891.

CYPRIEN O. MAILLOUX.

Witnesses:
WM. H. CAPEL,
T. F. CONREY.